April 8, 1924.
J. SCHORNACK
POWER JACK
Filed June 29, 1923
1,490,033
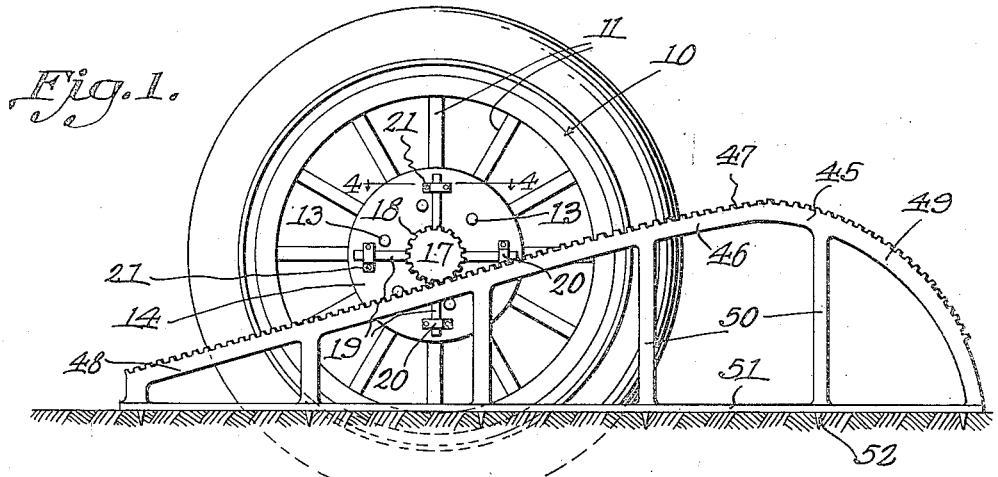
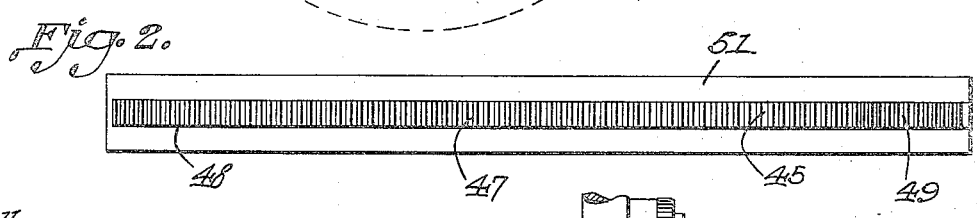
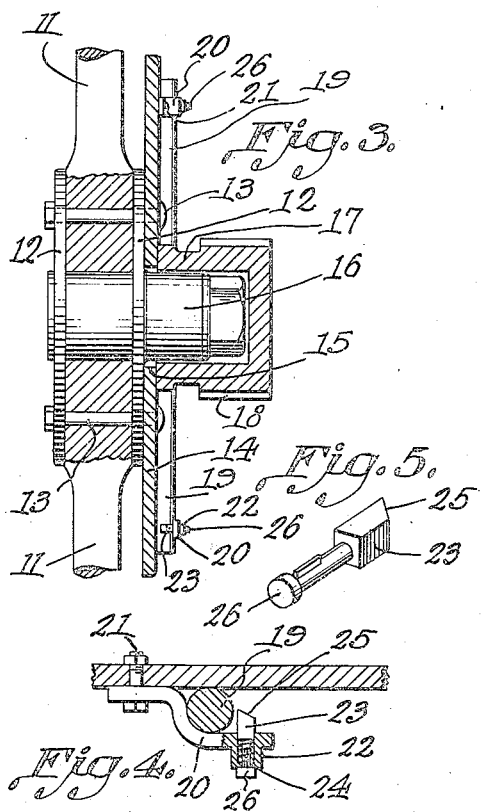
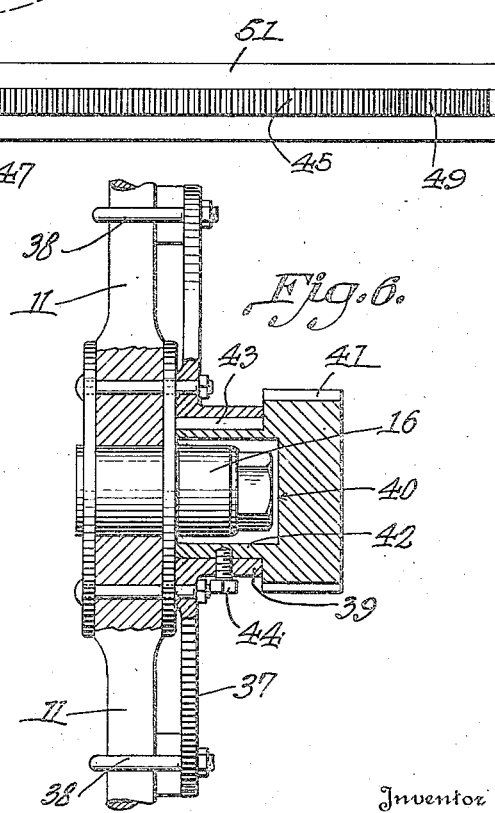
Inventor
James Schornack.
By B. P. Hilburn
Attorney Patented Apr. 8, 1924.

1,490,033

UNITED STATES PATENT OFFICE.

JAMES SCHORNACK, OF PHILADELPHIA, PENNSYLVANIA.

POWER JACK.

Application filed June 29, 1923. Serial No. 648,587.

*To all whom it may concern:*

Be it known that I, JAMES SCHORNACK, a citizen of the United States, residing at Philadelphia, in the county of Philadelphia and State of Pennsylvania, have invented certain new and useful Improvements in Power Jacks, of which the following is a specification.

My invention relates to power driven jacks, for raising an automobile, truck, or other vehicle, out of a mud hole or the like.

An important object of the invention is to provide a device of the above mentioned character, which is driven by the wheel of the vehicle, and is so constructed to possess the maximum power, in operation.

A further object of the invention is to provide a device of the above mentioned character, which may be permanently or detachably mounted upon the automobile wheel.

Other objects and advantages of the invention will be apparent during the course of the following description.

In the accompanying drawings forming a part of this specification, and in which like numerals are employed to designate like parts throughout the same, Figure 1 is a side elevation of a device embodying my invention, Figure 2 is a plan view of the track member, Figure 3 is a vertical sectional view through the device, parts in elevation, Figure 4 is a detail section taken on line 4—4 of Figure 1, Figure 5 is a perspective view of the sliding bolt, and, Figure 6 is a vertical section through a modified form of the device.

Attention being called first to Figures 1 to 4 inclusive, the numeral 10 designates the ordinary automobile wheel, embodying spokes 11, and a hub including hub plates 12, connected by bolts 13.

My power jack embodies a wheel attaching member, including a disk 14, having a central opening 15, receiving the hub 16 of the wheel. The disk 14 is provided with openings for receiving the hub bolts 13, which are preferably removed from the hub and then replaced, and extended through the openings in the disk 14. This is the preferred manner of securing the disk to the hub.

The numeral 17 designates a hollow hub gear member, which is cylindrical and is adapted to receive the hub 16 therein. This hub gear member is provided with gear teeth 18, as shown. Formed integral with the hollow hub gear member 17 are radial arms or rods 19, adapted for insertion within brackets 20, as more clearly shown in Figure 4. Each bracket 20 has its closed end clamped to the disk 14 by means of a bolt 21. The bracket 20 is provided at its open end with a transverse socket 22, receiving a sliding bolt 23, projected inwardly by means of a spring 24. The bolt is keyed within the socket 22 so that it cannot turn upon its longitudinal axis. The bolt 23 has a beveled face 25, as shown. The bolt is provided at its outer end with a head 26, by means of which the bolt may be manually retracted.

In view of the foregoing description, it is obvious that the hollow hub member 17 may be placed over the hub 16, with the radial arms 19 in advance of the bolts 23, and by turning the arms toward the bolts, said arms will force the bolts outwardly, which will again spring in advance of the arms, thereby locking them within the brackets 20. The bolts can be manually withdrawn when it is desired to remove the radial arms 19 from the brackets.

In Figure 6, I have shown a modification of the hub attaching element. This element embodies a disk 37, which is clamped to the hub by means of U-shaped bolts 38, surrounding the spokes 11 and passing through the disk 37. The disk 37 is provided at its center with a sleeve 39, receiving the hub 16, but spaced therefrom. The numeral 40 designates a hollow hub gear member, embodying a gear 41, and an inner sleeve 42, integral therewith. The sleeve 42 is adapted to telescope within the sleeve 39 and is keyed therein, by means of a key 43, so that these sleeves cannot rotate with relation to each other. A clamping bolt 44 is provided, to prevent the longitudinal movement of the sleeve 42 with relation to the sleeve 39.

The coacting element of the power jack embodies a lifting track 45, including a rail 46 having gear teeth 47 formed thereon. This rail embodies a rear inclined or elevating portion 48 and a forward curved lower portion 49. The rail 46 is supported by standards 50, integral therewith, engaging a base 51, integral therewith. This base is of sufficient width to prevent the same from sinking in the ground, and in order that it may not slip, it is preferably provided with pins or spikes 52.

In the use of either form of the invention, when the wheel sinks in the mud or is held within a depression in the roadway, the lifting track member is arranged upon the side of the wheel in suitably close relation to the same. With the hollow hub gear member mounted upon the wheel, in concentric relation to the hub of the wheel, the track member is brought into engagement beneath the same so that the gear teeth of the gear member engage with the gear teeth of the track member. It is thus apparent that when the wheel is rotated, in backing the automobile, that the wheel will travel up the track member, being thereby raised out of the hole and subsequently lowered upon the road. A particular advantage in my construction is that by mounting the hollow hub gear member upon the hub, in concentric relation thereto, the gear embodied therein may have the smallest possible diameter, and hence the lifting power of the device will be increased.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, what I claim is:

1. A power jack for the wheel of a motor driven vehicle, comprising a gear arranged adjacent to the hub of the wheel in concentric relation thereto and having a sleeve receiving the hub therein, means for attaching the sleeve to the wheel, and a lifting track member embodying an inclined rail having gear teeth to mesh with said gear.

2. A power jack for the wheel of a motor driven vehicle, comprising a hollow hub gear member adapted to be mounted upon the hub in concentric relation thereto, means for attaching the gear member to the wheel, and a lifting track member embodying an inclined rail having gear teeth to mesh with said gear member.

3. A power jack for the wheel of a motor driven vehicle, comprising a sleeve provided upon its periphery with gear teeth and adapted for insertion of the hub of the wheel in concentric relation thereto, means extending radially from the sleeve to attach the same to the wheel, and a track member embodying an inclined rail having gear teeth to engage with the gear teeth of said sleeve.

4. A power jack for the wheel of a motor driven vehicle, comprising a tubular member to be arranged upon the hub of the wheel and provided upon its periphery with gear teeth, radial arms secured to the tubular member, brackets secured to the wheel and having open ends, and spring pressed bolts carried by the brackets for holding the arms within the same.

In testimony whereof I affix my signature.

JAMES SCHORNACK.